(12) United States Patent
Sun et al.

(10) Patent No.: US 9,274,750 B2
(45) Date of Patent: Mar. 1, 2016

(54) SYSTEM AND METHOD FOR SIGNAL PROCESSING IN DIGITAL SIGNAL PROCESSORS

(75) Inventors: Tong Sun, Frisco, TX (US); Weizhong Chen, Austin, TX (US); Zhikun Cheng, Shanghai (CN); Yuanbin Guo, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 968 days.

(21) Appl. No.: 13/452,690

(22) Filed: Apr. 20, 2012

(65) Prior Publication Data

US 2013/0282778 A1    Oct. 24, 2013

(51) Int. Cl.
G06F 7/48      (2006.01)
G06F 7/483    (2006.01)
G06F 7/544    (2006.01)

(52) U.S. Cl.
CPC .............. *G06F 7/4806* (2013.01); *G06F 7/483* (2013.01); *G06F 7/5443* (2013.01)

(58) Field of Classification Search
None
See application file for complete search history.

(56) References Cited

U.S. PATENT DOCUMENTS

| 4,996,661 | A | * | 2/1991 | Cox et al. ...................... 708/508 |
| 5,359,548 | A | * | 10/1994 | Yoshizawa et al. ............ 708/505 |
| 5,953,241 | A | * | 9/1999 | Hansen et al. ................. 708/501 |
| 7,392,274 | B2 | * | 6/2008 | Shaw ............................. 708/505 |
| 2005/0091299 | A1 | | 4/2005 | Ko et al. |
| 2006/0101244 | A1 | | 5/2006 | Siu et al. |
| 2009/0248779 | A1 | | 10/2009 | Brooks et al. |
| 2010/0121898 | A1 | * | 5/2010 | Swartzlander et al. ........ 708/501 |
| 2011/0106871 | A1 | * | 5/2011 | Symes et al. .................. 708/603 |
| 2012/0041997 | A1 | * | 2/2012 | Inaganti et al. ............... 708/497 |

FOREIGN PATENT DOCUMENTS

| CN | 101174200 A | 5/2008 |
| CN | 101178645 A | 5/2008 |
| GB | 2474901 A | 5/2011 |
| JP | H04190453 A | 7/1992 |
| JP | H05174046 A | 7/1993 |
| JP | H09204294 A | 8/1997 |
| JP | 2011096254 A | 5/2011 |

(Continued)

OTHER PUBLICATIONS

E. Swartzlander and H.H. Saleh, "Floating-Point Implementation of Complex Multiplication", Proc. IEEE Forty-Third Asilomar Conf. Signals, pp. 926-929, 2009.*

(Continued)

*Primary Examiner* — Andrew Caldwell
*Assistant Examiner* — Matthew Sandifer
(74) *Attorney, Agent, or Firm* — Slater & Matsil, LLP (57) ABSTRACT

An embodiment of a method and a related apparatus for digital computation of a floating point complex multiply-add is provided. The method includes receiving an input addend, a first product, and a second product. The input addend, the first product and the second product each respectively has a mantissa and an exponent. The method includes shifting the mantissas of the two with smaller exponents of the input addend, the first product, and the second product to align together with the mantissa of the one with largest exponent of the input addend, the first product and the second product, and adding the aligned input addend, the aligned first product and the aligned second product.

32 Claims, 6 Drawing Sheets

(56) References Cited

FOREIGN PATENT DOCUMENTS

WO            2007018467 A1     2/2007
WO     WO 2007/133101 A1     11/2007

OTHER PUBLICATIONS

H.H. Saleh and E.E. Swartzlander, "A Floating-Point Fused Dot-Product Unit", Proc. IEEE Int'l Conf. Computer Design (ICCD), pp. 427-431, 2008.*

A.F. Tenca, "Multi-operand Floating-Point Addition", In Proceedings of the 2009 19th IEEE Symposium on Computer Arithmetic (ARITH '09), pp. 161-168, 2009.*

Extended European Search Report received in Application No. 12874679.9 mailed Apr. 7, 2015, 7 pages.

International Search Report and Written Opinion received in Patent Cooperation Treaty Application No. PCT/CN2012/075375, dated Jan. 31, 2013, 9 pages.

Goldberg, D., "What Every Computer Scientist Should Know About Floating-Point Arithmetic," edited reprint of the paper "What Every Computer Scientist Should Know About Floating-Point Arithmetic,", by David Goldberg, published in the Mar. 1991 issue of Computing Surveys, 1991, Association for Computing Machinery, Inc., pp. 171-264.

Suzuki, H., et al., "Leading-Zero Anticipatory Logic for High-Speed Floating Point Addition," IEEE Journal of Solid-State Circuits, Aug. 1996, pp. 1157-1164, vol. 31, No. 8, IEEE.

* cited by examiner

SYSTEM AND METHOD FOR SIGNAL PROCESSING IN DIGITAL SIGNAL PROCESSORS

TECHNICAL FIELD

The present invention relates generally to a system and method for digital computation, and more particularly to a system and method for constructing a floating-point complex multiply-add unit in a system such as a digital signal processor or a hardware accelerator.

BACKGROUND

Adders and multipliers are logical elements that perform basic digital numerical operations in digital processors such as microprocessors, digital signal processors ("DSPs"), arithmetic logic units ("ALUs"), hardware accelerators ("HACs"), etc. The overall performance of such devices is generally dependent on the speed and energy efficiency of its constituent logical elements. Adders, multipliers, and other logical elements are generally required to perform floating-point calculations, which inherently increases their complexity. The cost of microprocessors, DSPs, etc., is substantially proportional to the silicon area required to implement the logical elements from which they are formed. Thus, the design of adders, multipliers, etc., is an important consideration in providing a competitive design for an end product, and any improvement in efficiency and reduction in silicon area required for implementation can have a substantial impact on market acceptance.

The ability to improve the performance and reduce the silicon area required to implement ALUs, HACs, etc., without incurring unnecessary cost would answer an important market need.

SUMMARY OF THE INVENTION

Technical advantages are generally achieved by embodiments of the present invention which provide a system and method to calculate real and imaginary parts produced by a floating-point complex multiply-add process from a first complex multiplicand, a second complex multiplicand, and a complex addend.

In accordance with an example embodiment, a method and a related apparatus for digital computation of a floating point complex multiply-add are provided. The method includes receiving an input addend, a first product, and a second product. The input addend, the first product and the second product each respectively has a mantissa and an exponent. The method includes shifting the mantissas of the two with smaller exponents of the input addend, the first product, and the second product to align together with the mantissa of the one with largest exponent of the input addend, the first product and the second product, and adding the aligned input addend, the aligned first product and the aligned second product.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A device that performs a floating-point ("FLP") complex multiply-add ("CMAD") operation performs one of the most frequently used operations in signal processing of digital systems, such as graphic processing system, radar system and communication system. Speeding up and improving the energy efficiency of a CMAD operation can greatly improve performance of a DSP or other digital device.

Arithmetic operations on complex numbers raise even further challenges. Such complex-number operations are generally performed separately on the real and imaginary components of each term. A substantial amount of processing must be performed which consumes a significant amount of silicon area for its implementation and requires a significant amount of time for its execution.

As introduced herein, an embodiment of a digital processing unit implements a fast algorithm for a floating-point complex multiply-add process in a DSP, a hardware accelerator, etc.

In an embodiment, latency and the energy required to perform arithmetic operations on complex numbers are reduced. Characteristics of input data and intermediate calculation results are employed to produce a DSP or other arithmetic device that can efficiently execute a floating-point complex multiply-add operation.

A floating-point complex multiply-add unit executes the equation $$A = B + C \times D$$

where the terms A, B, C, and D are floating-point complex numbers, each component of which is generally represented in a digital floating-point format with a sign bit, exponent bits, and mantissa bits. The term B is an addend, and the terms C and D are first and second multiplicands, respectively. The term A is the complex floating-point multiply-add result. It should be noted that as an instance of complex number, real number can also be processed in accordance with the complex-number operation discussed in embodiments of the invention.

In accordance with an embodiment of the invention, it is not necessary to implement a floating-point CMAD operation with a standard floating-point multiplication operation followed by a standard floating-point addition operation. Take a communication system for example, the CMAD computation can be simplified to meet the precision requirement of a baseband application, such as employed in a communication systems designed to operate under, for example, Long-Term Evolution ("LTE"), Universal Mobile Telecommunications System ("UMTS"), and Global System for Mobile Communications ("GSM") cellular specifications.

Combining complex multiplication and addition into one process allows substantial opportunity for logic circuitry to be optimized in a signal processor for less processing latency and higher power efficiency. For example, redundancies can be removed from the logic, computational steps can be merged, and carry-save adders can be used.

Resolving the floating point complex multiply-add equation illustrated above into real and imaginary components (i.e., A.real and A.imaginary) produces the two equations:

$$A.real = B.real + C.real \times D.real - C.imaginary \times D.imaginary$$

$$A.imaginary = B.imaginary + C.real \times D.imaginary + C.imaginary \times D.real,$$

each of which in an embodiment can each be implemented with digital logic that performs real arithmetic. The result of the equation for A.real is the sum of a real number plus the product of two real numbers from which the product of two real numbers is subtracted. The result of the equation for A.imaginary is the sum of a real number plus a product of two real numbers plus a product of two further real numbers. Each equation includes a real addend and a sum of a real product and either addition or subtraction of a real product. Among the input addend and the two real products, the mantissas of the two numbers with smaller exponents are shifted to align with the mantissa of the third number with the greatest exponent. The sum of the three mantissas is calculated with a carry-save adder followed by a two-input full adder.

The mantissas of the two products and the input addend are aligned according to their exponents and truncated according to their mantissas to drop unnecessarily precise low-order bits if there are. The two truncated products are then added and/or subtracted to/from the truncated input addend.

The bit width of the adders is determined according to precision requirements of an application. Precision loss caused by truncation can be partially compensated by slightly increasing the bit width of the adders. Normalization of the two products of the mantissas can be avoided (by adding one more bit to the adder bit width) to save processing circuitry and processing time. The using of the addend of the CMAD can be postponed to a later pipeline stage in order to reduce the initiation interval of software pipelining.

Figure 1:
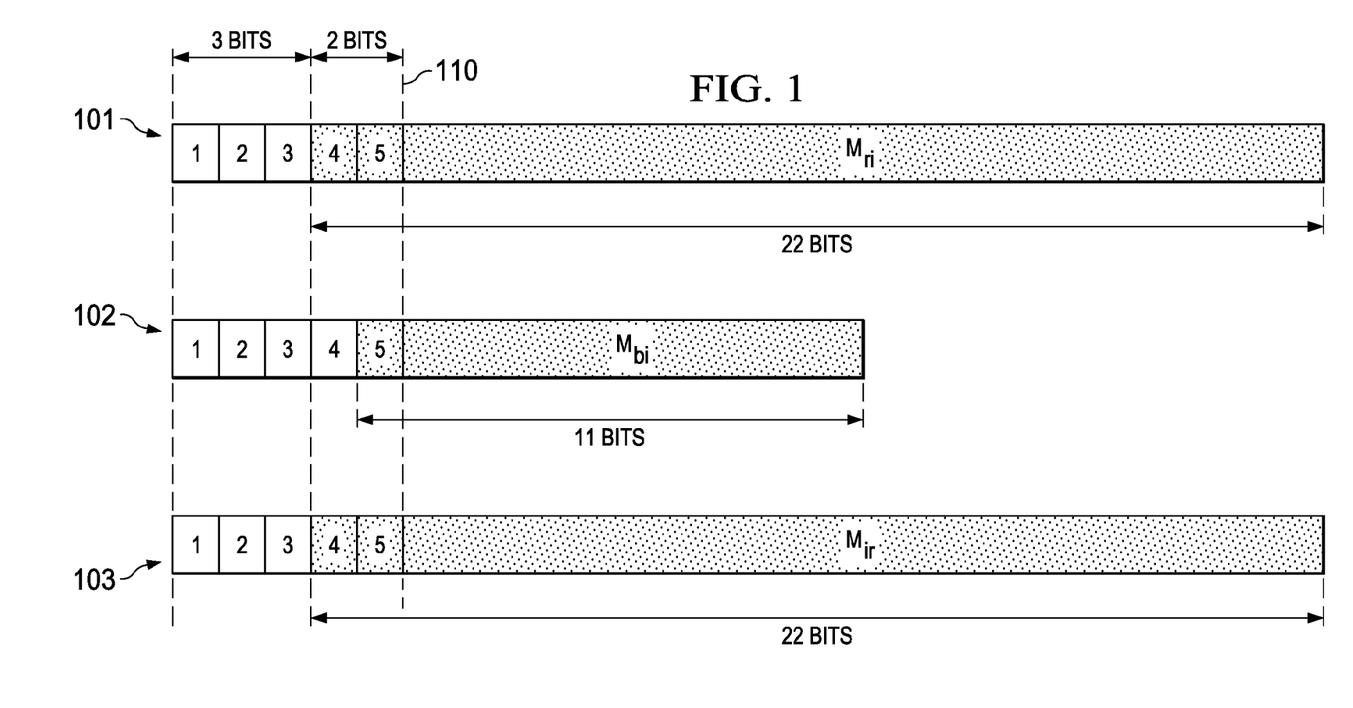
FIGS. 1 and 2 illustrate a graphical representations of alignment and truncation of mantissas of summed terms, in accordance with an embodiment.
Figure 2:
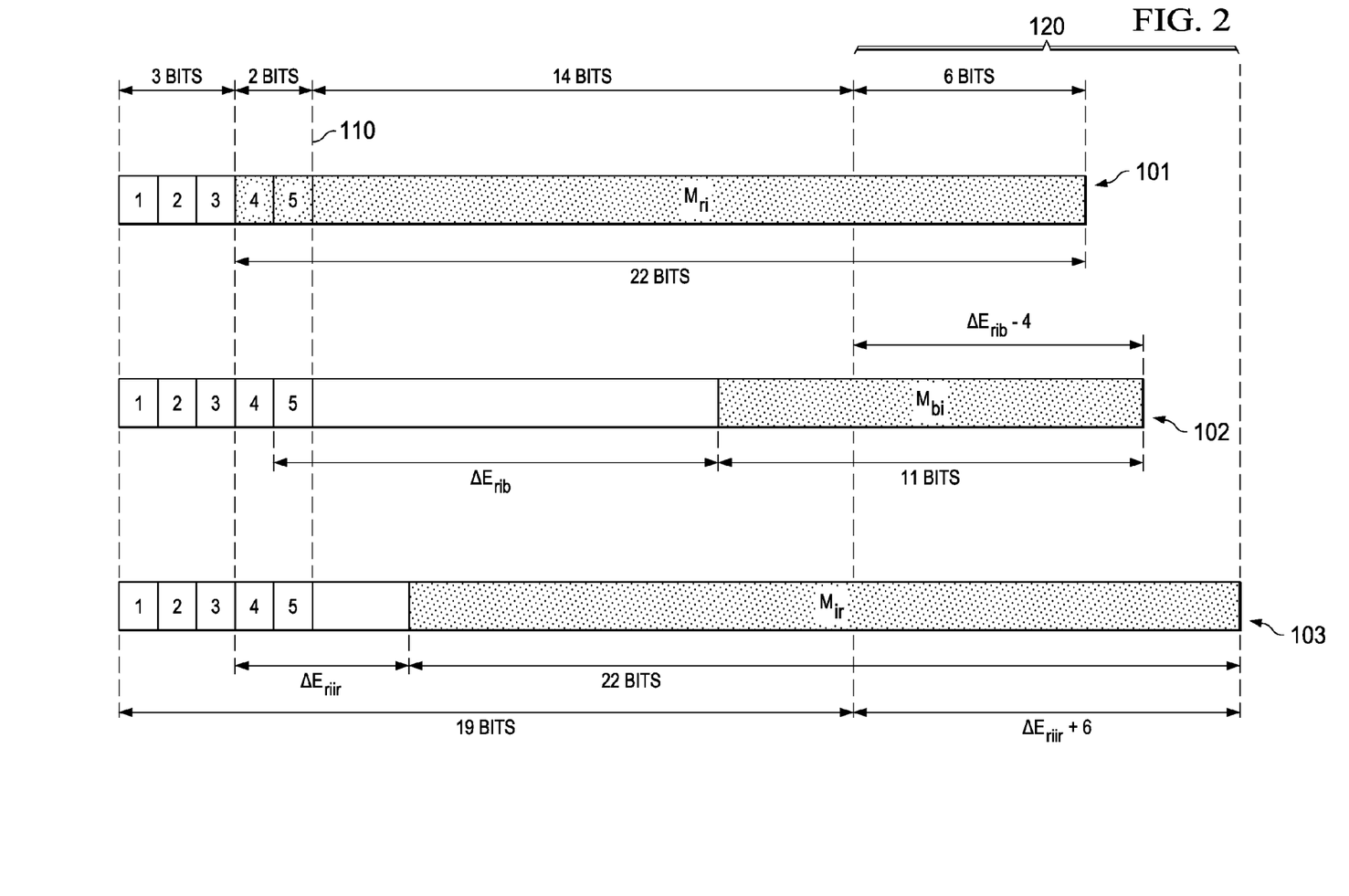

Turning now to FIGS. 1 and 2, illustrated are graphical representations of alignment and truncation of three example mantissas 101, 102, and 103 of the three terms to be summed, according to an embodiment. In particular, FIG. 1 illustrates the three example mantissas 101, 102 and 103 before alignment, and FIG. 2 illustrates the three example mantissas 101, 102, and 103 after alignment.

In the truncation example illustrated in FIGS. 1 and 2, a floating-point input binary real number is represented as a sign bit, five exponent bits, and ten mantissa bits. The input mantissas are assumed to be preceded by a hidden "1" bit. Accordingly, each mantissa is assumed to be 11 bits of the form "1.xxxxxxxxxx," i.e., the hidden bit "1" followed by ten mantissa bits after the radix point. Thus, each input mantissa is normalized to the range 1≤mantissa<2. Straightforward multiplication of 11-bit mantissas would ordinarily produce up to a 22-bit mantissa product, which contains unnecessary precision in the low-order bits for many applications.

The notation illustrated in FIGS. 1 and 2 follows that of the real and imaginary equations above for A.real and A.imaginary with further parameters in which $M_{bi}$ is the mantissa of B.imaginary, $M_{ri}$ is the mantissa product of C.real and D.imaginary, and $M_{ir}$ it is the mantissa product of C.imaginary and D.real.

It is assumed in the example of FIGS. 1 and 2 that (C.real× D.imaginary) has the greatest exponent. Then the respective shifting distances of $M_{bi}$ and $M_{ir}$ for the alignment are $$\Delta E_{rib} = \exp(C.real) + \exp(D.imaginary) - \exp(B.real), \text{ and}$$

$$\Delta E_{rir} = \exp(C.real) + \exp(D.imaginary) - (\exp(C.imaginary) + \exp(D.real)).$$

The objective of the process is to set all exponents of the summed terms equal to the maximum exponent. This results in the radix point 110 being the same for each component after aligning the exponents.

The three mantissas 101, 102, and 103 after aligning the radix points are assumed to be represented by a leading sign bit, identified by the bit "1" in FIGS. 1 and 2, followed by two bits to accommodate possible carries produced by addition of the three terms, identified by bits "2" and "3," followed by two further bits, "4" and "5" to accommodate the integral part of the products. The five leading bits are followed by 14 fractional bits to keep the necessary precision. The truncated bits 120 are ignored because they represent the unnecessary level of precision that can be determined by examining the requirements of the end application.

In this example, six bits are truncated from the term with the largest exponent to produce a 19-bit mantissa. Truncation of bits from the mantissas 102, 103 are correspondingly made to produce two 19-bit mantissas. The three resulting truncated mantissas can be added, in this example, with a 19-bit adder.

Referring initially to FIG. 1, in accordance with an embodiment of the invention, to align mantissa 102 with mantissa 101, the bit "4" of mantissa 102 (after alignment) is filled with a "0" bit to produce a 12-bit mantissa, and the resulting 12-bit mantissa 102 is shifted right by the bit distance $\Delta E_{rib}$ so that the whole bit length of mantissa 102 becomes $(\Delta E_{rib} + 12)$ after alignment, which is $\Delta E_{rib}$ plus the original 11 bits of $M_{bi}$ plus one bit of the added "0" in bit "4."

Mantissa 101 is truncated to 16 bits, as desired in accordance with precision requirement, and mantissa 102 is correspondingly truncated so that the truncated part of mantissa 102 becomes $(\Delta E_{rib} + 12 - 16)$, i.e., $(\Delta E_{rib} - 4)$.

Figure 3:
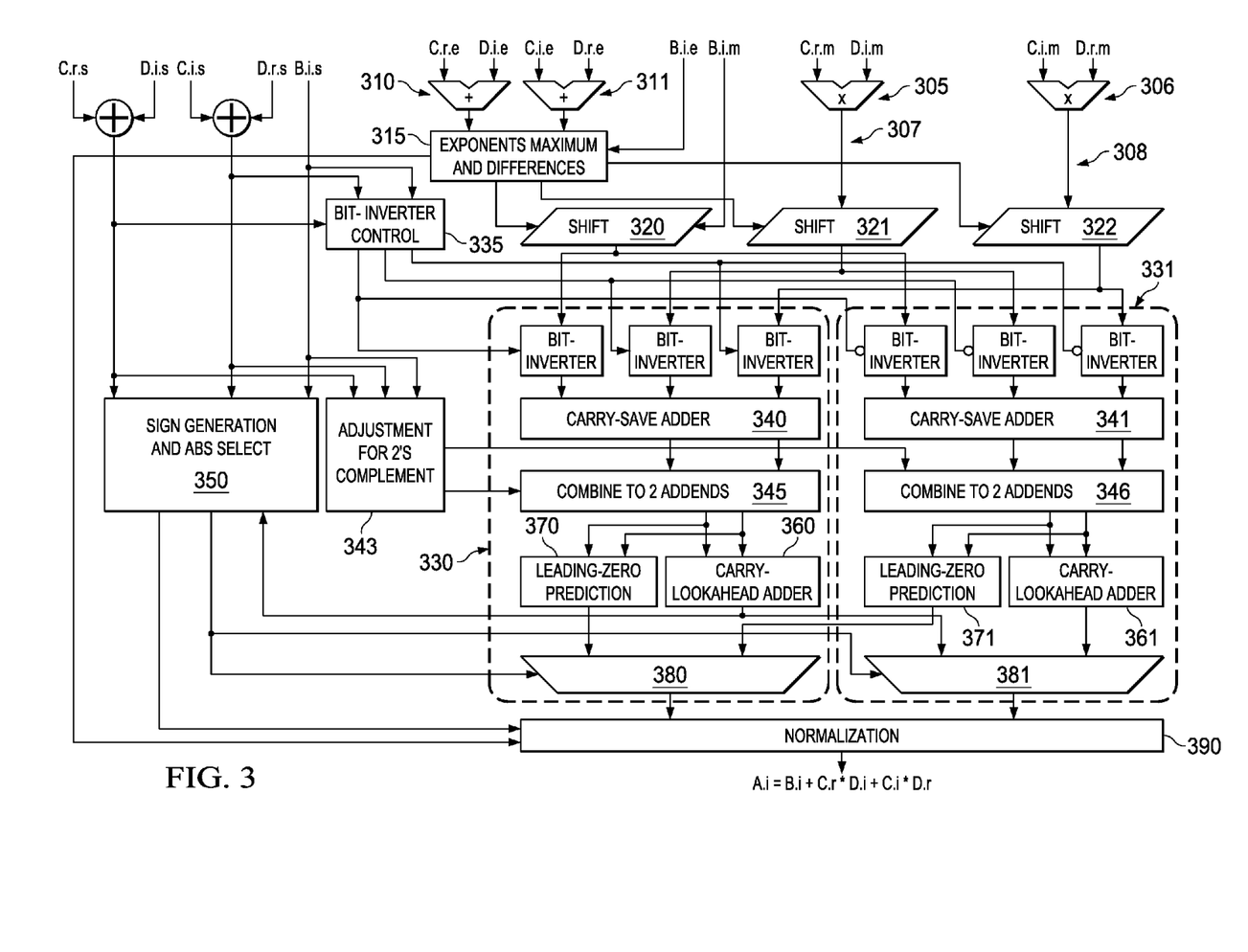
FIG. 3 illustrates a block diagram of a complex floating-point multiply-add unit configured to compute the imaginary part of the complex number A=B+C×D, in accordance with an embodiment.
Figure 4:
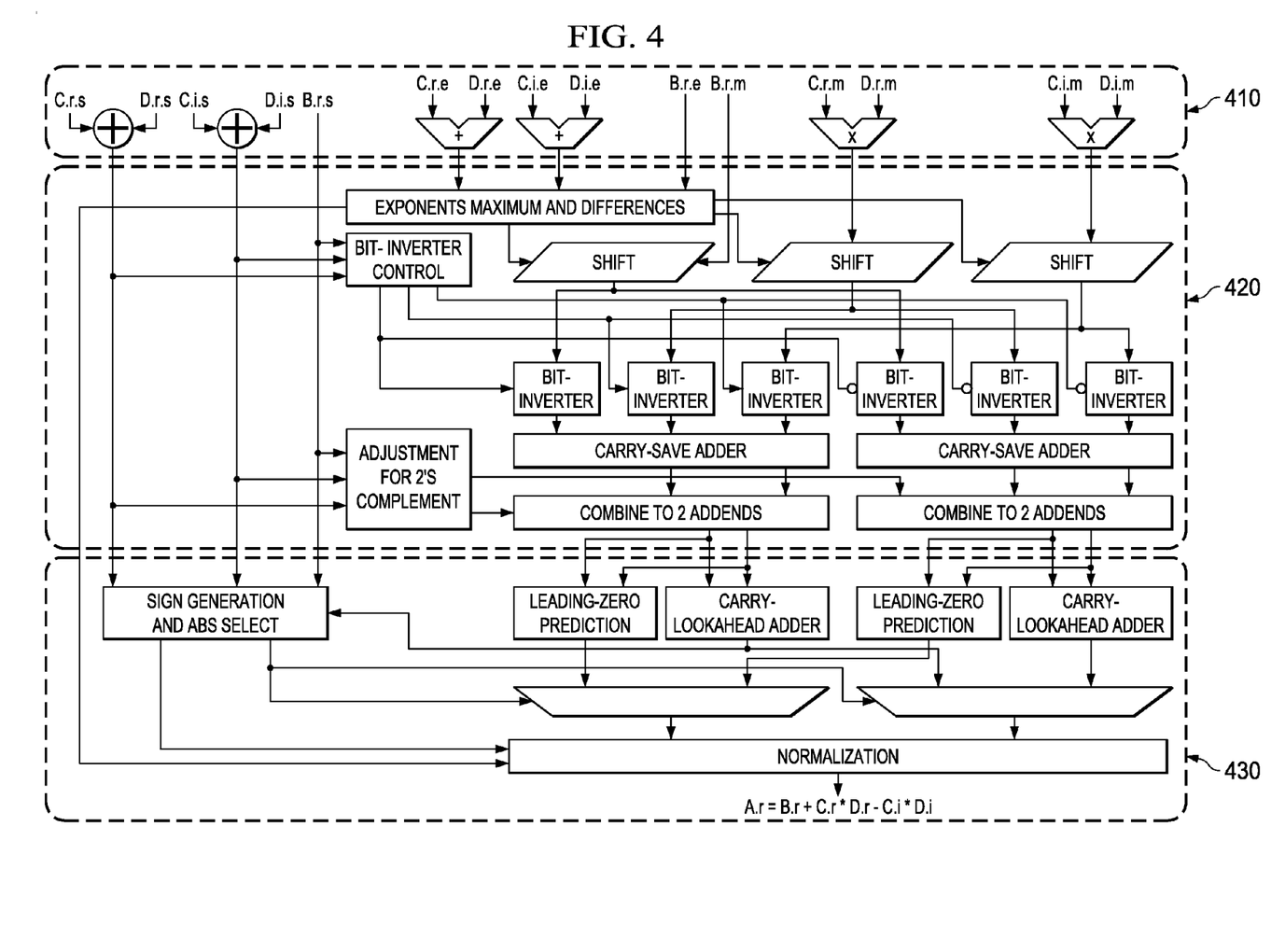
FIG. 4 illustrates a block diagram of a complex floating-point multiply-add unit configured to compute the real part of the complex number A=B+C×D, in accordance with an embodiment.

Turning now to FIGS. 3 and 4, illustrated is a block diagram respectively showing arrangement and interconnection of logical binary processes for computation of the imaginary part A.imaginary and real part A.real of A=B+C×D employing a complex floating-point multiply-add unit, in accordance with an embodiment. The inputs C.r.s, C.i.s, D.r.s, D.i.s, B.r.s, and B.i.s represent, respectively, the real and imaginary sign bits of the term and factors C, D, and B. The inputs C.r.e, C.i.e, D.r.e, D.i.e, B.r.e, and B.i.e represent, respectively, the real and imaginary exponent bits of the term and factors C, D, and B. The inputs B.r.m, B.i.m, C.r.m, C.i.m, D.r.m, and D.i.m, represent, respectively, the real and imaginary mantissa bits of the term and factors B, C, and D. The mantissa inputs are coupled to multipliers 305 and 306 that produce 2+20 bit products 307, 308. The products 307, 308 produced by the multipliers 305, 306 are not normalized, i.e., the location of the radix point produced by multiplication is retained without normalizing of the radix point of the product to save some processing circuitry and time. The exponent bits of the inputs are coupled to adders 310 and 311, the outputs of which and the exponent bits of the input B.i.e are coupled to an exponents maximum and differences block 315 that determines the necessary shift for alignment of the radices. The outputs of the exponents maximum and differences block 315 are coupled to shift registers 320, 321, and 322 that shift the input data to achieve the alignment of the radices. The alignment performed by the exponents maximum and differences block 315, in conjunction with shift registers 320, 321, and 322, operates according to the process illustrated and described hereinabove with reference to FIG. 1.

The outputs of the shift registers are coupled to two paths 330, 331 including bit inverters that are used to form twos-complement representations of the shifted 2+20 bit products and the shifted mantissa of the addend and perform computation using twos-complement arithmetic. In an embodiment, it is not necessary to employ twos-complement arithmetic. The two paths 330, 331 are provided because the sign of the resulting addition is not yet known. The calculation of the absolute value of the sum is advanced by computing the negative sum in parallel with the sum in paths 330, 331. The bit inverters are controlled by bit-inverter control block 335, the inputs of which are the exclusively-ORed sign bits C.r.s^D.i.s and C.i.s^D.r.s and the sign bit B.r.s of the real component of the addend B. The left path 330 assumes a positive result of the addition, and the right path 331 assumes a negative result. The addition in each respective path is performed with a carry-save adder, 340, 341 followed by combining the adjustment bits (for two's complement calculation) with the two outputs of the carry-save adder, 345, 346, and further followed by the carry-look-ahead adder, 360, 361. The adjustment bits come from the block 343 which generate the adjustment bits (as part of the two's complement calculation) based on the sign bits of the input terms of CMAD operation. Selection of the result in the left path 330 or the right path 331 is made by multiplexers 380 and 381 that are controlled by sign generation and absolute value select block 350.

The purpose of aligning the two mantissa products and the input addend all together and then calculating the sum is that a carry-save adder (340, 341) followed by a carry-look-ahead adder (360, 361) (or a ripple-carry adder) can be used to reduce calculation latency. Otherwise, two carry-look-ahead adders (or two ripple-carry adders) would be used serially, which has longer latency.

By adding one more bit to the adder width, the normalization of mantissa products is avoided to save some processing circuitry and time.

For the normalization of the final result, a leading zero prediction process 370, 371, is employed to reduce processing latency. Leading zero prediction allows the number of leading zeros before a leading "1" bit to be calculated in parallel with the addition done in the carry-look-ahead adder. A leading "1" bit prediction process is described by Suzuki, et al., in the paper entitled "Leading-Zero Anticipatory Logic for High-speed Floating Point Addition," IEEE Journal of Solid-State Circuits, Vol. 31, No. 8, August 1996, which is hereby incorporated herein by reference.

The inputs to the sign generation and absolute value select block 350 are the exclusively-ORed sign bits C.r.s^D.i.s and C.i.s^D.r.s and the sign bit B.i.s of the real component of the addend B and the sign bit of the output of 360 as illustrated in the left portion of FIG. 3. The output of the selected multiplexer, 380 or 381, is normalized in the normalization block 390 by shifting left or right so that the leading one is located on the left side the radix point, which forms the normalized mantissa (10 bits on the right side of the radix point in the present example) of the final CMAD result. The exponent from block 315 is then adjusted in block 390 according to the direction and distance of the shifting. The sign bit from block 350, the normalized mantissa, and the adjusted exponent are combined into the final result in floating point format, which is the imaginary component A.imaginary of the floating-point complex multiply-add unit, shown at the bottom of FIG. 3 as "A.i." The terms and factors that form A.i are shown at the bottom of FIG. 3 as B.i, C.r, D.i, C.i, and D.r, which are the same variables, respectively, as B.imaginary, C.real, D.imaginary, C.imaginary, and D.real.

Turning now to FIG. 4, illustrated is a block diagram of a floating-point complex multiply-add unit configured to compute the real part A.real of the complex number A, in accordance with an embodiment. The logical elements of the complex floating-point multiply-add unit illustrated in FIG. 4 are formed and arranged similarly to those illustrated in FIG. 3 and will not be further described in the interest of brevity.

The units illustrated in FIGS. 3 and 4 can be implemented as multi-stage pipelined units for higher throughput. A multi-stage pipelined unit is generally formed as a plurality of operational stages that are executed in sequence to produce a final result. However, after a first stage computes a result for a first input and passes the result to a second stage, the first stage is now available to process a second input in parallel with execution of processes in the second stage. In this manner, each of the plurality of operational stages can be employed to process data simultaneously for a plurality of inputs. As an example of this structure, the mantissa of the real part of the addend B, i.e., B.r.m, is coupled to the non-first pipeline stage 420. Correspondingly, the mantissa of the imaginary part of the addend B in FIG. 3, i.e., B.i.m, is coupled to a corresponding second pipeline stage.

The sequenced stages of the complex floating-point multiply-add unit illustrated in FIG. 4 are identified as a first stage 410, a second stage is 420, and a third stage is 430. Similar sequenced stages can be identified in FIG. 3. Accordingly, the first stage 410 illustrated in FIG. 4 is configured to operate on a second set of data as soon as the first stage 410 passes results of operations on a first set of data to the second stage 420. Similarly, the second stage 420 is configured to operate on a second set of data as soon as the second stage 420 passes results of operations on the first set of data to the third stage 430.

Figure 5:
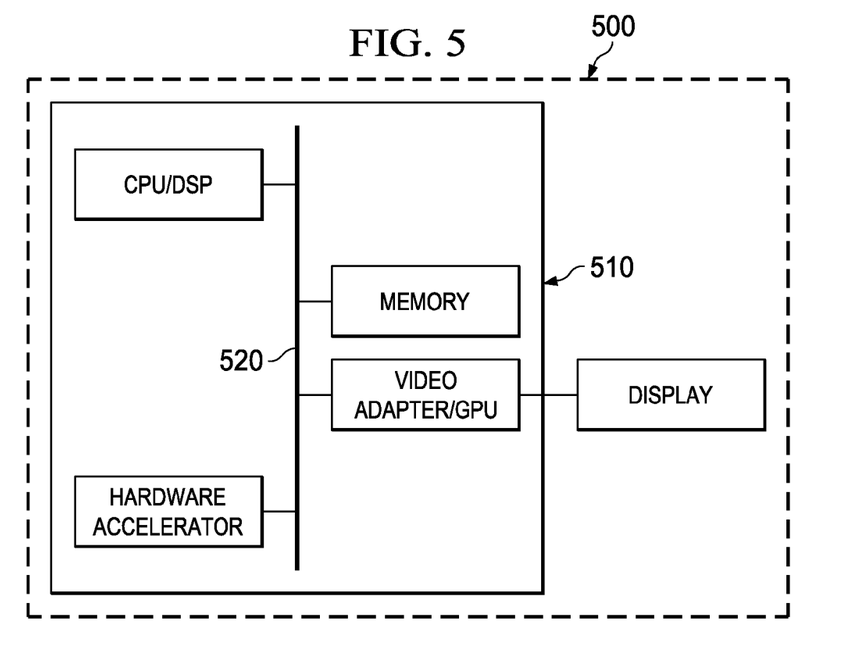
FIG. 5 illustrates a block diagram of elements of a processing system that may be used to perform one or more of the processes discussed herein, in accordance with an embodiment.

Referring now to FIG. 5, illustrated is a block diagram of elements of a processing system 500 that may be used to perform one or more of the processes discussed hereinabove, in accordance with an embodiment. The processing system 500 may comprise a processor 510 equipped with one or more input/output devices, such as a video adapter/graphics processing unit ("GPU"). The processor 510 may include a central processing unit ("CPU")/DSP, memory, and a hardware accelerator connected to a bus 520.

The bus 520 may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), nonvolatile random access memory ("NVRAM"), a combination thereof, or the like. In an embodiment, the memory may include ROM for use at boot-up, and DRAM for data storage for use while executing programs.

The video adapter/GPU provides an interface to couple the processor to a display. Other devices may be coupled to the processor, and additional or fewer interface cards may be utilized. For example, a parallel interface card (not shown) may be used to provide a parallel interface for a printer.

The processor may also include a network interface (not shown), which can be a wired link, such as an Ethernet cable or the like, and/or a wireless link to enable communication with a network such as a cellular communication network. The network interface allows the processor to communicate with remote units via the network. In an embodiment, the processor is coupled to a local-area network or a wide-area network to provide communications to remote devices, such as other processors, the Internet, remote storage facilities, or the like.

Figure 6A:
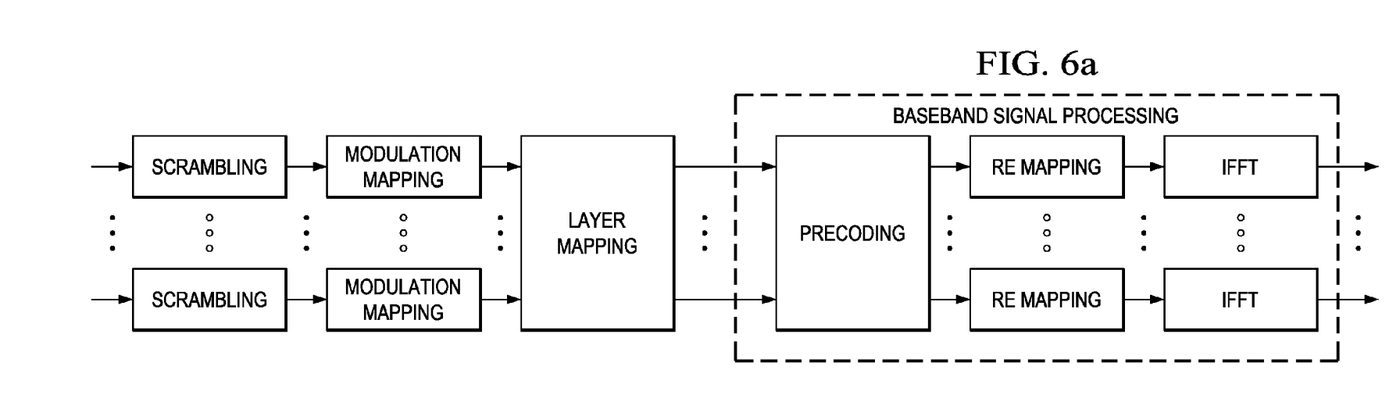
FIGS. 6a and 6b illustrate a block diagram of baseband signaling process of communication system in accordance with an embodiment.
Figure 6B:
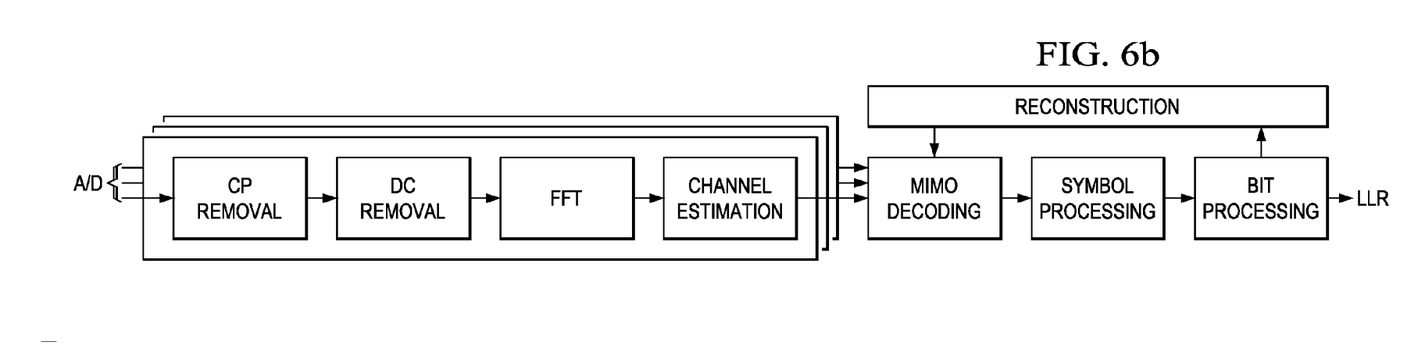

Referring to FIGS. 6a and 6b, typical implementation of the baseband signal processing in the downlink transmission and in the uplink transmission of LTE system are respectively illustrated. In various embodiments, the invention may apply to signal process at base station or UE.

In accordance with an embodiment of the invention, the floating point complex multiply-add computation in the baseband signal process includes receiving three baseband signals in complex format. Each of the three baseband signals in the complex format has a mantissa and an exponent. In an embodiment of the invention, the baseband signals in the complex format further includes one or more bit for the sign. In an embodiment of the invention, the method of the floating point complex multiply-add computation in the base band signal process includes receiving/obtaining a first baseband signal as an input addend, generating a first product and a second product from a second baseband signal and a third baseband signal, wherein the input addend, the first product and the second product respectively has a mantissa and an exponent; shifting the mantissas of two with smaller exponents of the input addend, the first product and the second product to align together with the mantissa of one with largest exponent of the input addend, the first product and the second product in a processor; and adding the aligned input addend, the aligned first product and the aligned second product together.

In an embodiment, the two products are formed by multiplying real part/imaginary part of the second baseband signal with real part/imaginary part of the third baseband signal. For example, a first product is a multiplied product of a real part of the second baseband signal and a real part of the third baseband signal, and the second product is a multiplied product of an imaginary part of the second baseband signal and an imaginary part of the third baseband signal. In an alternative embodiment, the first product is a multiplied product of a real part of the second baseband signal and an imaginary part of the third baseband signal, and the second product is a multiplied product of an imaginary part of the second baseband signal and a real part of the third baseband signal.

It should be noted that the processing system may include other components. For example, the processing system may include power supplies, cables, a motherboard, removable storage media, cases, and the like. These other components, although not shown, are considered part of the processing system.

The result of using the method described hereinabove in a complex multiply-add operation is improved performance and power efficiency of floating point DSPs and hardware accelerators. Higher power efficiency and higher processing speed can be achieved. Substantial benefits can accrue to a wireless baseband digital signal processor or a system on chip ("SOC") for base stations and terminal devices.

It is noted that, unless indicated otherwise, functions described herein can be performed in either hardware or software, or some combination thereof, with or without human intervention. In an embodiment, the functions are performed by a processor such as a computer or an electronic data processor, such as that discussed hereinabove with reference to FIG. 5, in accordance with code such as computer program code, software, and/or integrated circuits that are coded to perform such functions, unless indicated otherwise.

Embodiments such as those presented herein provide an apparatus and a related method to calculate a real part produced by a floating-point complex multiply-add process from a first complex multiplicand, a second complex multiplicand, and a complex addend. The apparatus is formed with a memory and a processor coupled to the memory. In an embodiment, the processor, in conjunction with the memory or independently, is configured to form a first mantissa product of a mantissa of a real part of the first complex multiplicand and a mantissa of a real part of the second complex multiplicand, and form a second mantissa product of a mantissa of an imaginary part of the first complex multiplicand and a mantissa of an imaginary part of the second complex multiplicand. In another embodiment, the processor, in conjunction with the memory or independently, is further configured to, form a first exponent sum of an exponent of the real part of the first complex multiplicand and an exponent of the real part of the second complex multiplicand, form a second exponent sum of an exponent of the imaginary part of the first complex multiplicand and an exponent of the imaginary part of the second complex multiplicand.

In an embodiment, the processor, in conjunction with the memory or independently, is further configured to find a maximum exponent among exponents of the real part of the complex addend, the first exponent sum, and the second exponent sum. In another embodiment, the processor, in conjunction with the memory or independently, is further configured to, align the first mantissa product, the second mantissa product, and the mantissa of the real part of the complex addend according to their respective exponents with respect to the maximum among the exponents, truncate least significant bits of the aligned first mantissa product, second mantissa product, and real part of the complex addend. In another embodiment, the processor is further configured to convert the aligned first mantissa product, second mantissa product, and real part of the complex addend to twos-complement format according to their signs. The converted aligned first mantissa product, the second mantissa product, and the real part of the complex addend are then added by the processor to form a non-normalized mantissa of the real part produced by the floating-point complex multiply-add process. The non-normalized mantissa of the real part produced by the floating-point complex multiply-add process is normalized by shifting bits to produce a leading "1" bit to the left of a radix point of the normalized mantissa. The maximum exponent among the exponents of the real part of the complex addend, the first exponent sum, and the second exponent sum is adjusted according to a shifting distance resulting from the shifting the bits to produce the leading "1" bit to the left of a radix point.

In an embodiment, the processor, in conjunction with the memory or independently, is further configured to add the aligned first mantissa product, second mantissa product, and real part of the complex addend with a carry-save adder followed by a two-input full adder. In an embodiment, the two-input full adder is a carry-look-ahead adder.

In an embodiment, the processor, in conjunction with the memory or independently, is further configured to add the aligned first mantissa product, second mantissa product, and real part of the complex addend with the carry-save adder followed by the two-input full adder in two paths, one path of which is selected prior to the normalizing the mantissa of the real part according to a control signal generated by a sign generation and absolute value select process.

In an embodiment, the processor, in conjunction with the memory or independently, is further configured to add the aligned first mantissa product, second mantissa product, and real part of the complex addend with twos-complement arithmetic. In an embodiment, it is not necessary to employ twos-complement arithmetic.

In an embodiment, the processor, in conjunction with the memory or independently, is further configured to convert the added aligned first mantissa product, second mantissa product, and real part of the complex addend from the twos-complement format to a sign-magnitude format.

In an embodiment, the processor, in conjunction with the memory or independently, is further configured to compensate a precision loss caused by truncating the least significant bits by increasing a bit width of adders configured to add the aligned mantissas.

In an embodiment, the processor, in conjunction with the memory or independently, is configured to retain the location of a radix point of the first mantissa product and a radix point of the second mantissa product produced by multiplication without normalizing the first mantissa product and the second mantissa product.

In an embodiment, the processor, in conjunction with the memory or independently, is configured to postpone use of the mantissa of the real part of the complex addend to a second or later pipeline stage.

In an embodiment, the processor, in conjunction with the memory or independently, is further configured to calculate an imaginary part produced by the floating-point complex multiply-add process from the first complex multiplicand, the second complex multiplicand, and the complex addend. In another embodiment, the processor, in conjunction with the memory or independently, is configured to form a third mantissa product of a mantissa of an imaginary part of the first complex multiplicand and the mantissa of the real part of the second complex multiplicand, form a fourth mantissa product of the mantissa of the real part of the first complex multiplicand and a mantissa of an imaginary part of the second complex multiplicand, form a third exponent sum of an exponent of the imaginary part of the first complex multiplicand and an exponent of the real part of the second complex multiplicand, form a fourth exponent sum of an exponent of the real part of the first complex multiplicand and an exponent of the imaginary part of the second complex multiplicand, find a maximum exponent among exponents of the imaginary part of the complex addend, the third exponent sum, and the fourth exponent sum, align the third mantissa product, the fourth mantissa product, and the mantissa of the imaginary part of the complex addend according to their respective exponents with respect to the maximum among the exponents of the imaginary part of the complex addend, the third exponent sum, and the fourth exponent sum.

The processor in conjunction with the memory is further configured to truncate least significant bits of the aligned third mantissa product, fourth mantissa product, and imaginary part of the complex addend, convert the aligned third mantissa product, fourth mantissa product, and imaginary part of the complex addend to twos-complement format according to their signs, add the converted aligned third mantissa product, fourth mantissa product, and the imaginary part of the complex addend to form a non-normalized mantissa of the imaginary part produced by the floating-point complex multiply-add process, normalize the non-normalized mantissa of the imaginary part produced by the floating-point complex multiply-add process by shifting to produce a leading "1" bit to the left of a radix point of the normalized mantissa of the imaginary component produced by the floating-point complex multiply-add process, and adjust the maximum exponent among the exponent of the imaginary part of the complex addend, the third exponent sum, and the fourth exponent sum according to a shifting distance resulting from the shifting to produce the leading "1" bit to the left of a radix point.

Embodiments such as those presented herein provide an apparatus and a related method to calculate a real part produced by a floating-point complex multiply-add process. The apparatus is formed with a memory and a processor coupled to the memory. The processor is configured to calculate a real part produced by a floating-point complex multiply-add process operating on a first complex multiplicand, a second complex multiplicand, and a complex addend, find a maximum exponent among exponents of the real part of the complex addend, a first exponent sum of an exponent of the real part of the first complex multiplicand and an exponent of the real part of the second complex multiplicand, and a second exponent sum of an exponent of the imaginary part of the first complex multiplicand and an exponent of the imaginary part of the second complex multiplicand, and align a first mantissa product of the real part of the first complex multiplicand and the real part of the second complex multiplicand, a second mantissa product of the imaginary part of the first complex multiplicand and the imaginary part of the second complex multiplicand, and the mantissa of the real part of the complex addend according to their respective exponents with respect to the maximum exponent among the exponents.

In an embodiment, the processor, coupled to the memory or independently, is further configured to truncate least significant bits of the aligned mantissas, convert the aligned and truncated first mantissa product, second mantissa product, and real part of the complex addend to twos-complement format according to their signs, and add the converted mantissas to form a non-normalized sum mantissa.

In an embodiment, the processor is further configured to normalize the non-normalized sum mantissa by shifting bits to produce a leading "1" bit to the left of a radix point thereof to form the real part produced by the floating-point complex multiply-add process. In another embodiment, the processor is further configured to adjust the maximum exponent according to a bit shifting distance resulting from the shifting.

Embodiments such as those presented herein provide a method and a related apparatus for digital computation of a floating point complex multiply-add. The apparatus is formed with a memory and a processor coupled to the memory. The method includes receiving an input addend, a first product, and a second product, wherein the input addend, the first product the second product each respectively has a mantissa and an exponent, shifting the mantissas of two with smaller exponents of the input addend, the first product and the second product to align together with the mantissa of one with largest exponent of the input addend, the first product and the second product in a processor, and adding the aligned input addend, the aligned first product and the aligned second product.

In an embodiment, the input addend is a real part of a first input, the first product is a multiplied product of a real part of a second input and a real part of a third input, and the second product is a multiplied product of an imaginary part of the second input and an imaginary part of the third input.

In an embodiment, the adding the aligned input addend, the aligned first product and the aligned second product includes adding the aligned input addend with and the aligned first product and subtracting the aligned second product from a sum of the aligned input addend and the aligned first product.

In an embodiment, the method further includes forming a mantissa of the first product by multiplying a mantissa of the real part of the second input with a mantissa of the real part of the third input, forming an exponent of the first product by summing an exponent of the real part of the second input and an exponent of the real part of the third input, forming a mantissa of the second product by multiplying a mantissa of the imaginary part of the second input with a mantissa of the imaginary part of the third input, and forming an exponent of the second product by summing an exponent of the imaginary part of the second input and an exponent of the imaginary part of the third input.

In an embodiment, the mantissa of the real part of the second input, the mantissa of the real part of the third input, the mantissa of the imaginary part of the second input and the mantissa of the imaginary part of the third input are not normalized before multiplication.

In an embodiment, the input addend is an imaginary part of a first input, the first product is a multiplied product of a real part of a second input and an imaginary part of a third input, and the second product is a multiplied product of an imaginary part of the second input and a real part of the third input.

In an embodiment, the method further includes forming a mantissa of the first product by multiplying a mantissa of the real part of the second input with a mantissa of the imaginary part of the third input, forming an exponent of the first product by summing an exponent of the real part of the second input and an exponent of the imaginary part of the third input, forming a mantissa of the second product by multiplying a mantissa of the imaginary part of the second input with a mantissa of the real part of the third input, and forming an exponent of the second product by summing an exponent of the imaginary part of the second input and an exponent of the real part of the third input.

In an embodiment, the mantissa of the real part of the second input, the mantissa of the real part of the third input, the mantissa of the imaginary part of the second input and the mantissa of the imaginary part of the third input are not normalized before multiplication.

In an embodiment, the first product is a product of two non-normalized inputs. In an embodiment, the second product is a product of two non-normalized inputs.

In an embodiment, the shifting the mantissas of the two with smaller exponents of the input addend, the first product and the second product to align together with the mantissa of the one with largest exponent of the input addend, the first product and the second product includes shifting the mantissas of the two with the smaller exponents right to align together with the mantissa of the one with the largest exponent, wherein the aligned input addend, the aligned first product and the aligned second product have a same exponent number.

In an embodiment, the method further includes truncating one or more bits of the aligned input addend, the aligned first product and the aligned second product, if a bit width of mantissas of the aligned input addend, the aligned first product and the aligned second product exceeds a bit width in accordance with a precision requirement.

In an embodiment, the method further includes converting the input addend, the first product, and the second product to twos-complement format according to their signs.

In an embodiment, the converting the input addend, the first product, and the second product to twos-complement format according to their signs includes converting the aligned input addend, the aligned first product, and the aligned second product to twos-complement format according to their signs.

In an embodiment, the adding the aligned input addend, the aligned first product and the aligned second product includes adding the converted aligned input addend, the converted aligned first product, and the converted aligned second product.

In an embodiment, the adding the aligned input addend, the aligned first product and the aligned second product includes adding the aligned input addend, the aligned first product and the aligned second product by a carry-save adder and a full adder.

In an embodiment, the adding the aligned input addend, the aligned first product and the aligned second product includes adding the aligned input addend, the aligned first product the aligned second product in two paths, one path of which is selected according to a control signal generated by a sign generation and absolute value select process.

Embodiments such as those presented herein provide an apparatus and a related method to perform digital computation of a floating-point complex multiply-add process. The apparatus is formed with a memory and a processor coupled to the memory. The processor is configured to receive an input addend, a first product and a second product, wherein the input addend, the first product and the second product each respectively has a mantissa and an exponent, shift the mantissas of two with smaller exponents of the input addend, the first product and the second product to align together with the mantissa of one with largest exponent of the input addend, the first product and the second product, and add the aligned input addend, the aligned first product and the aligned second product.

In an embodiment, the input addend is a real part of a first input, the first product is a multiplied product of a real part of a second input and a real part of a third input, and the second product is a multiplied product of an imaginary part of the second input and an imaginary part of the third input.

In an embodiment, the processor configured to add the aligned input addend, the aligned first product, and the aligned second product is configured to add the aligned input addend with and the aligned first product and subtract the aligned second product from a sum of the aligned input addend and the aligned first product.

In an embodiment, the processor is further configured to form a mantissa of the first product by multiplying a mantissa of the real part of the second input with a mantissa of the real part of the third input, form an exponent of the first product by summing an exponent of the real part of the second input and an exponent of the real part of the third input, form a mantissa of the second product by multiplying a mantissa of the imaginary part of the second input with a mantissa of the imaginary part of the third input, and form an exponent of the second product by summing an exponent of the imaginary part of the second input and an exponent of the imaginary part of the third input.

In an embodiment, the input addend is an imaginary part of a first input, the first product is a multiplied product of a real part of a second input and an imaginary part of a third input, and the second product is a multiplied product of an imaginary part of the second input and a real part of the third input.

In an embodiment, the processor is further configured to form a mantissa of the first product by multiplying a mantissa of the real part of the second input with a mantissa of the imaginary part of the third input, form an exponent of the first product by summing an exponent of the real part of the second input and an exponent of the imaginary part of the third input, form a mantissa of the second product by multiplying a mantissa of the imaginary part of the second input with a mantissa of the real part of the third input, and form an exponent of the second product by summing an exponent of the imaginary part of the second input and an exponent of the real part of the third input.

In an embodiment, the first product is a product of two non-normalized inputs. In an embodiment, the second product is a product of two non-normalized inputs.

In an embodiment, the processor configured to shift the mantissas of the two with smaller exponents of the input addend, the first product and the second product to align together with the mantissa of the one with largest exponent of the input addend, the first product and the second product is configured to shift the mantissas of the two with the smaller exponents right to align together with the mantissa of the one with the largest exponent, wherein the aligned input addend, the aligned first product and the aligned second product have a same exponent number.

In an embodiment, the processor is further configured to truncate one or more bits of the aligned input addend, the aligned first product and the aligned second product if a bit width of mantissas of the aligned input addend, the aligned first product and the aligned second product exceeds a bit width in accordance with a precision requirement.

In an embodiment, the processor is further configured to convert the input addend, the first product, and the second product to twos-complement format according to their signs.

In an embodiment, the processor configured to convert the input addend, the first product, and the second product to twos-complement format according to their signs is further configured to convert the aligned input addend, the aligned first product, and the aligned second product to twos-complement format according to their signs.

In an embodiment, the processor configured to add the aligned input addend, the aligned first product and the aligned second product is further configured to add the converted aligned input addend, the converted aligned first product, and the converted aligned second product.

In an embodiment, the processor configured to add the aligned input addend, the aligned first product and the aligned second product is further configured to add the aligned input addend, the aligned first product, and the aligned second product with a carry-save adder and a full adder.

In an embodiment, the processor configured to add the aligned input addend, the aligned first product, and the aligned second product is further configured to add the aligned input addend, the aligned first product and the aligned second product in two paths, one path of which is selected according to a control signal generated by a sign generation and absolute value select process.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for digital computation of floating point complex multiply-add in a wireless communications apparatus, comprising:
   receiving three wireless baseband signals;
   generating an input addend, a first product and a second product from the three wireless baseband signals, wherein the input addend, the first product and the second product each respectively has a mantissa and an exponent, wherein the first product and the second product are not normalized, and wherein one of the input addend, the first product and the second product has a largest exponent relative to a remaining two of the input addend, the first product and the second product;
   shifting, by a hardware shifter, the mantissas of the remaining two of the input addend, the first product and the second product to align together with the mantissa of the one with the largest exponent of the input addend, the first product and the second product;
   adding, by a hardware adder, the aligned input addend, the aligned first product and the aligned second product, without prior normalization, to generate an addition result; and
   using the addition result in further processing the three wireless baseband signals.

2. The method of claim 1, wherein the input addend is a real part of a first input, the first product is a multiplied product of a real part of a second input and a real part of a third input, and the second product is a multiplied product of an imaginary part of the second input and an imaginary part of the third input.

3. The method of claim 2, wherein the adding the aligned input addend, the aligned first product and the aligned second product comprises
   adding the aligned input addend with and the aligned first product and subtracting the aligned second product from a sum of the aligned input addend and the aligned first product.

4. The method of claim 2, further comprising:
   forming a mantissa of the first product by multiplying a mantissa of the real part of the second input with a mantissa of the real part of the third input;
   forming an exponent of the first product by summing an exponent of the real part of the second input and an exponent of the real part of the third input;
   forming a mantissa of the second product by multiplying a mantissa of the imaginary part of the second input with a mantissa of the imaginary part of the third input; and
   forming an exponent of the second product by summing an exponent of the imaginary part of the second input and an exponent of the imaginary part of the third input.

5. The method of claim 4, wherein the mantissa of the real part of the second input, the mantissa of the real part of the third input, the mantissa of the imaginary part of the second input and the mantissa of the imaginary part of the third input are not normalized before multiplication.

6. The method of claim 1, wherein the input addend is an imaginary part of a first input, the first product is a multiplied product of a real part of a second input and an imaginary part of a third input, and the second product is a multiplied product of an imaginary part of the second input and a real part of the third input.

7. The method of claim 6, further comprising:
   forming a mantissa of the first product by multiplying a mantissa of the real part of the second input with a mantissa of the imaginary part of the third input;
   forming an exponent of the first product by summing an exponent of the real part of the second input and an exponent of the imaginary part of the third input;
   forming a mantissa of the second product by multiplying a mantissa of the imaginary part of the second input with a mantissa of the real part of the third input; and
   forming an exponent of the second product by summing an exponent of the imaginary part of the second input and an exponent of the real part of the third input.

8. The method of claim 6, wherein the mantissa of the real part of the second input, the mantissa of the real part of the third input, the mantissa of the imaginary part of the second input and the mantissa of the imaginary part of the third input are not normalized before multiplication.

9. The method of claim 1, wherein the first product is a product of two non-normalized inputs.

10. The method of claim 1, wherein the second product is a product of two non-normalized inputs.

11. The method of claim 1, wherein the shifting the mantissas of the remaining two of the input addend, the first product and the second product to align together with the mantissa of the one having largest exponent of the input addend, the first product and the second product comprises
shifting the mantissas of the remaining two of the input addend, the first product and the second product right to align together with the mantissa of the one having the largest exponent of the input addend, the first product and the second product, wherein the aligned input addend, the aligned first product and the aligned second product have a same exponent number.

12. The method of claim 1, further comprising
truncating one or more bits of the aligned input addend, the aligned first product and the aligned second product, if a bit width of mantissas of the aligned input addend, the aligned first product and the aligned second product exceeds a bit width in accordance with a precision requirement.

13. The method of claim 1, further comprising
converting the input addend, the first product, and the second product to twos-complement format according to their signs.

14. The method of claim 13, wherein the converting the input addend, the first product, and the second product to twos-complement format according to their signs comprises
converting the aligned input addend, the aligned first product, and the aligned second product to twos-complement format according to their signs.

15. The method of claim 14, wherein the adding the aligned input addend, the aligned first product and the aligned second product comprises
adding the converted aligned input addend, the converted aligned first product and the converted aligned second product.

16. The method of claim 1, wherein the adding the aligned input addend, the aligned first product and the aligned second product comprises
adding the aligned input addend, the aligned first product and the aligned second product by a carry-save adder and a full adder.

17. The method of claim 1, wherein the adding the aligned input addend, the aligned first product and the aligned second product comprises
adding the aligned input addend, the aligned first product and the aligned second product in two paths, one path of which is selected according to a control signal generated by a sign generation and absolute value select process.

18. A wireless communications apparatus to perform digital computation of a floating-point complex multiply-add, the apparatus comprising:
a memory; and
a processor coupled to the memory, the processor configured to receive three wireless baseband signals, and to generate an input addend, a first product and a second product from the wireless baseband signals, wherein the input addend, the first product and the second product each respectively has a mantissa and an exponent, wherein the first product and the second product are not normalized, and wherein one of the input addend, the first product and the second product has a largest exponent relative to a remaining two of the input addend, the first product and the second product, the processor comprising:
a hardware shifter configured to shift the mantissas the remaining two of the input addend, the first product and the second product to align together with the mantissa of the one with the largest exponent of the input addend, the first product and the second product, and
a hardware adder configured to add the aligned input addend, the aligned first product and the aligned second product, without prior normalization, to generate an addition result;
the processor further configured to use the addition result in further processing the three wireless baseband signals.

19. The apparatus of claim 18, wherein the input addend is a real part of a first input, the first product is a multiplied product of a real part of a second input and a real part of a third input, and the second product is a multiplied product of an imaginary part of the second input and an imaginary part of the third input.

20. The apparatus of claim 19, wherein the processor configured to add the aligned input addend, the aligned first product, and the aligned second product is configured to add the aligned input addend with and the aligned first product and subtract the aligned second product from a sum of the aligned input addend and the aligned first product.

21. The apparatus of claim 19, wherein the processor is further configured to:
form a mantissa of the first product by multiplying a mantissa of the real part of the second input with a mantissa of the real part of the third input;
form an exponent of the first product by summing an exponent of the real part of the second input and an exponent of the real part of the third input;
form a mantissa of the second product by multiplying a mantissa of the imaginary part of the second input with a mantissa of the imaginary part of the third input; and
form an exponent of the second product by summing an exponent of the imaginary part of the second input and an exponent of the imaginary part of the third input.

22. The apparatus of claim 18, wherein the input addend is an imaginary part of a first input, the first product is a multiplied product of a real part of a second input and an imaginary part of a third input, and the second product is a multiplied product of an imaginary part of the second input and a real part of the third input.

23. The apparatus of claim 22, wherein the processor is further configured to:
form a mantissa of the first product by multiplying a mantissa of the real part of the second input with a mantissa of the imaginary part of the third input;
form an exponent of the first product by summing an exponent of the real part of the second input and an exponent of the imaginary part of the third input;
form a mantissa of the second product by multiplying a mantissa of the imaginary part of the second input with a mantissa of the real part of the third input; and
form an exponent of the second product by summing an exponent of the imaginary part of the second input and an exponent of the real part of the third input.

24. The apparatus of claim 18, wherein the first product is a product of two non-normalized inputs.

25. The apparatus of claim 18, wherein the second product is a product of two non-normalized inputs.

26. The apparatus of claim 18, wherein the processor configured to shift the mantissas of the remaining two of the input addend, the first product and the second product to align together with the mantissa of the one having largest exponent of the input addend, the first product and the second product comprises the processor configured to     shift the mantissas of the remaining two of the input addend, the first product and the second product right to align together with the mantissa of the one having the largest exponent of the input addend, the first product and the second product, wherein the aligned input addend, the aligned first product and the aligned second product have a same exponent number.

27. The apparatus of claim 18, wherein the processor is further configured to     truncate one or more bits of the aligned input addend, the aligned first product and the aligned second product if a bit width of mantissas of the aligned input addend, the aligned first product and the aligned second product exceeds a bit width in accordance with a precision requirement.

28. The apparatus of claim 18, wherein the processor is further configured to     convert the input addend, the first product, and the second product to twos-complement format according to their signs.

29. The apparatus of claim 28, wherein the processor configured to convert the input addend, the first product, and the second product to twos-complement format according to their signs is further configured to     convert the aligned input addend, the aligned first product, and the aligned second product to twos-complement format according to their signs.

30. The apparatus of claim 29, wherein the processor configured to add the aligned input addend, the aligned first product and the aligned second product is further configured to     add the converted aligned input addend, the converted aligned first product and the converted aligned second product.

31. The apparatus of claim 18, wherein the processor configured to add the aligned input addend, the aligned first product and the aligned second product is further configured to     add the aligned input addend, the aligned first product and the aligned second product with a carry-save adder and a full adder.

32. The apparatus of claim 18, wherein the processor configured to add the aligned input addend, the aligned first product, and the aligned second product is further configured to     add the aligned input addend, the aligned first product and the aligned second product in two paths, one path of which is selected according to a control signal generated by a sign generation and absolute value select process.

\* \* \* \* \*